A. A. PAULY.
APPARATUS FOR FORMING ARTIFICIAL STONE.
APPLICATION FILED JULY 1, 1908.
965,002.
Patented July 19, 1910.
5 SHEETS—SHEET 1.
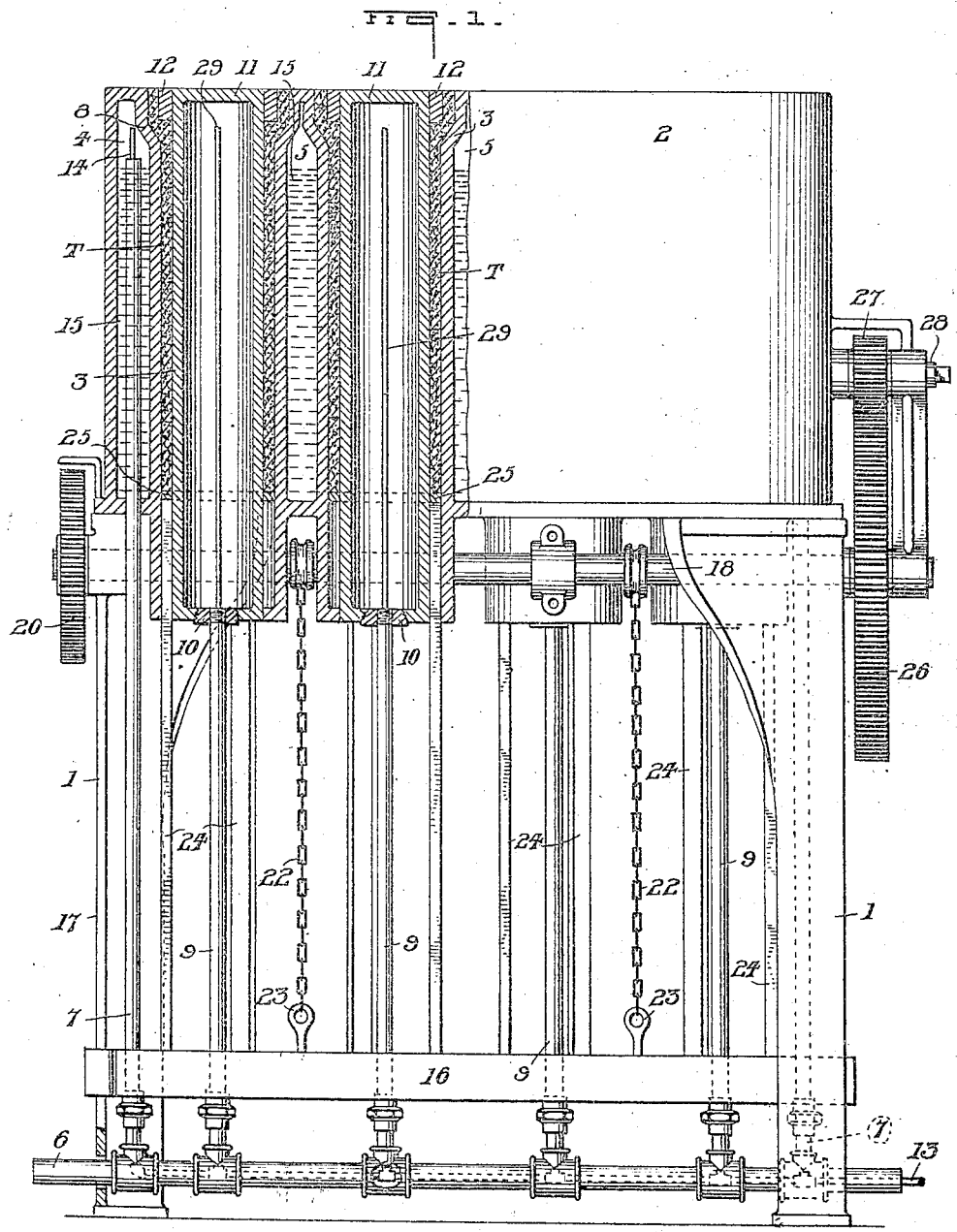

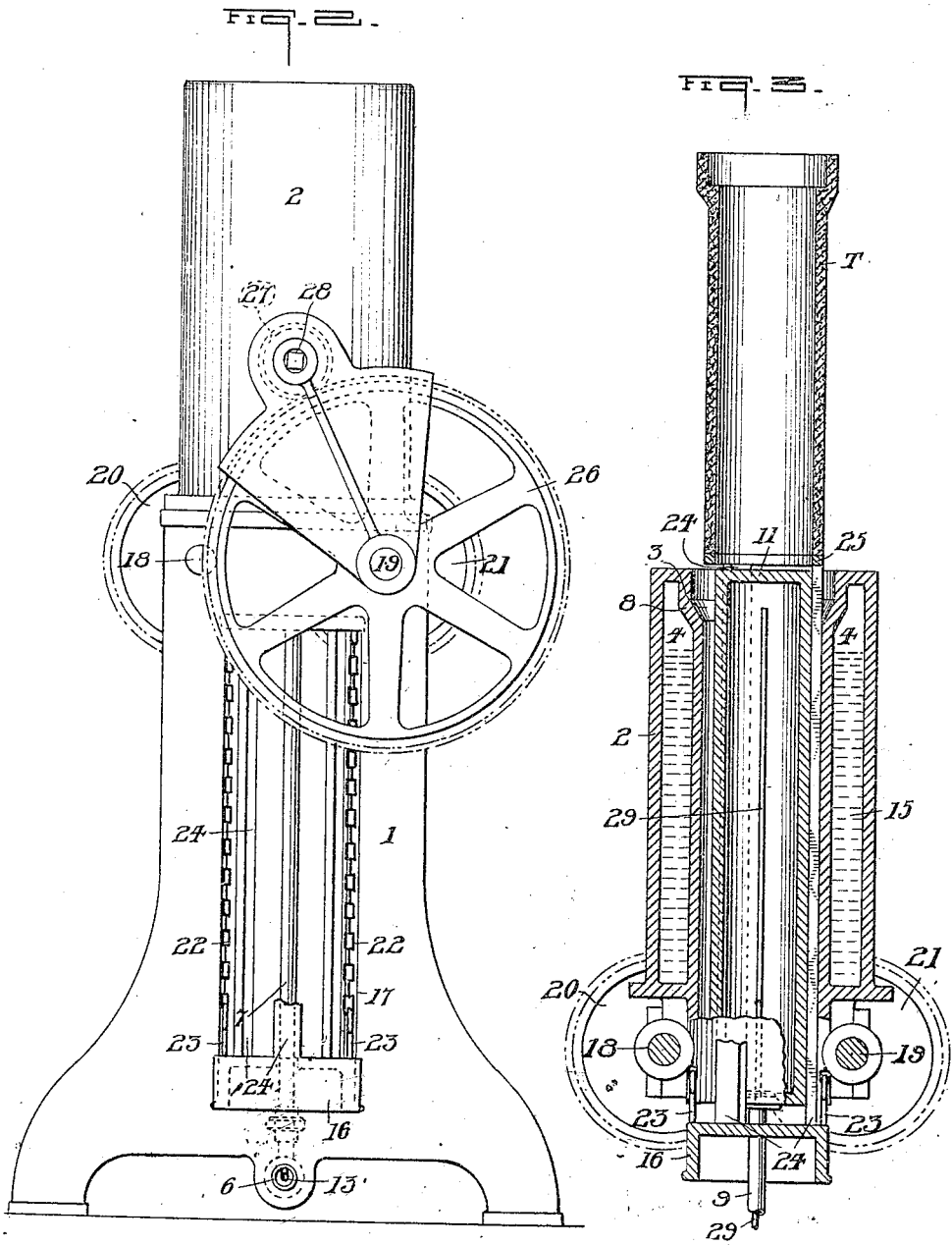

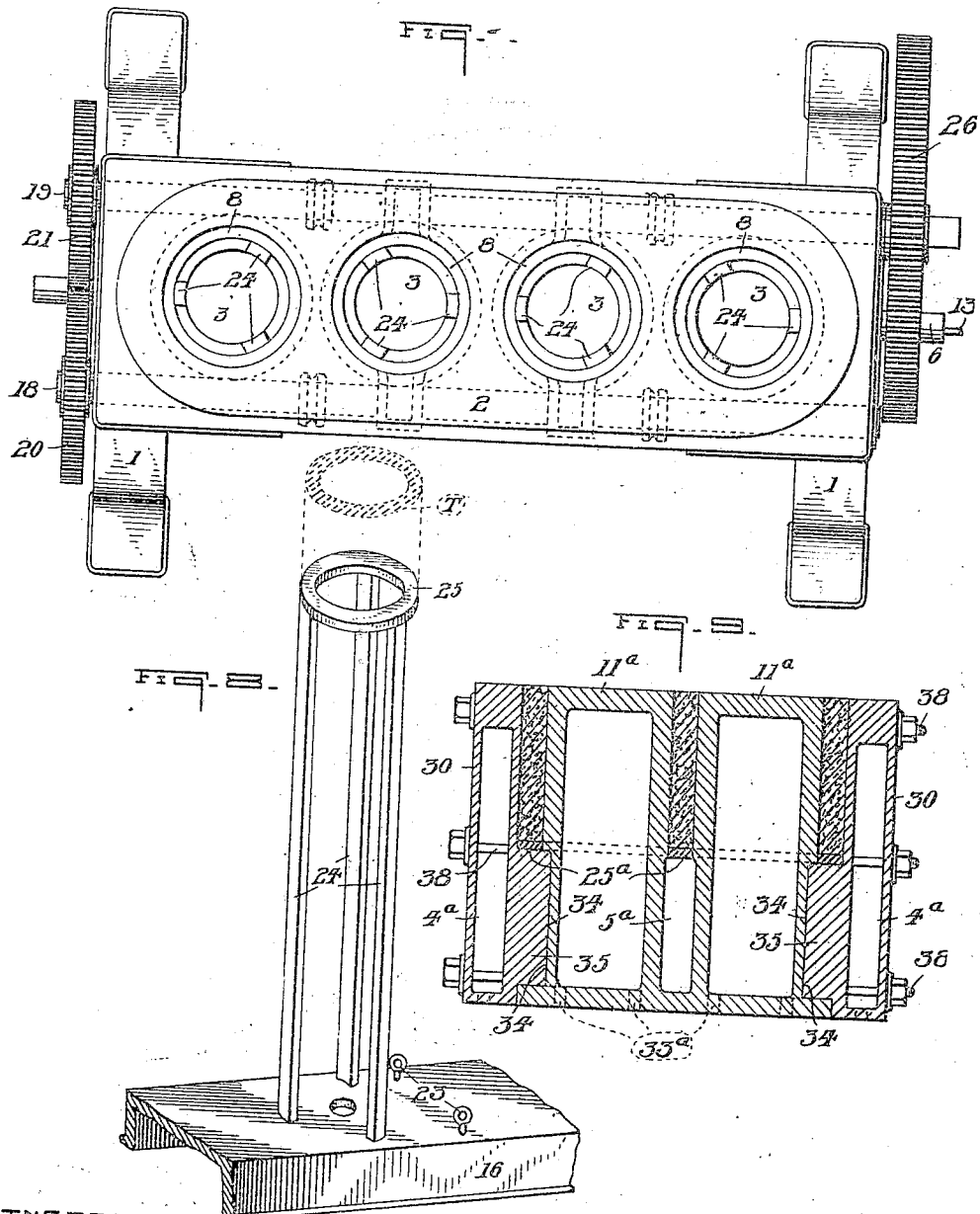

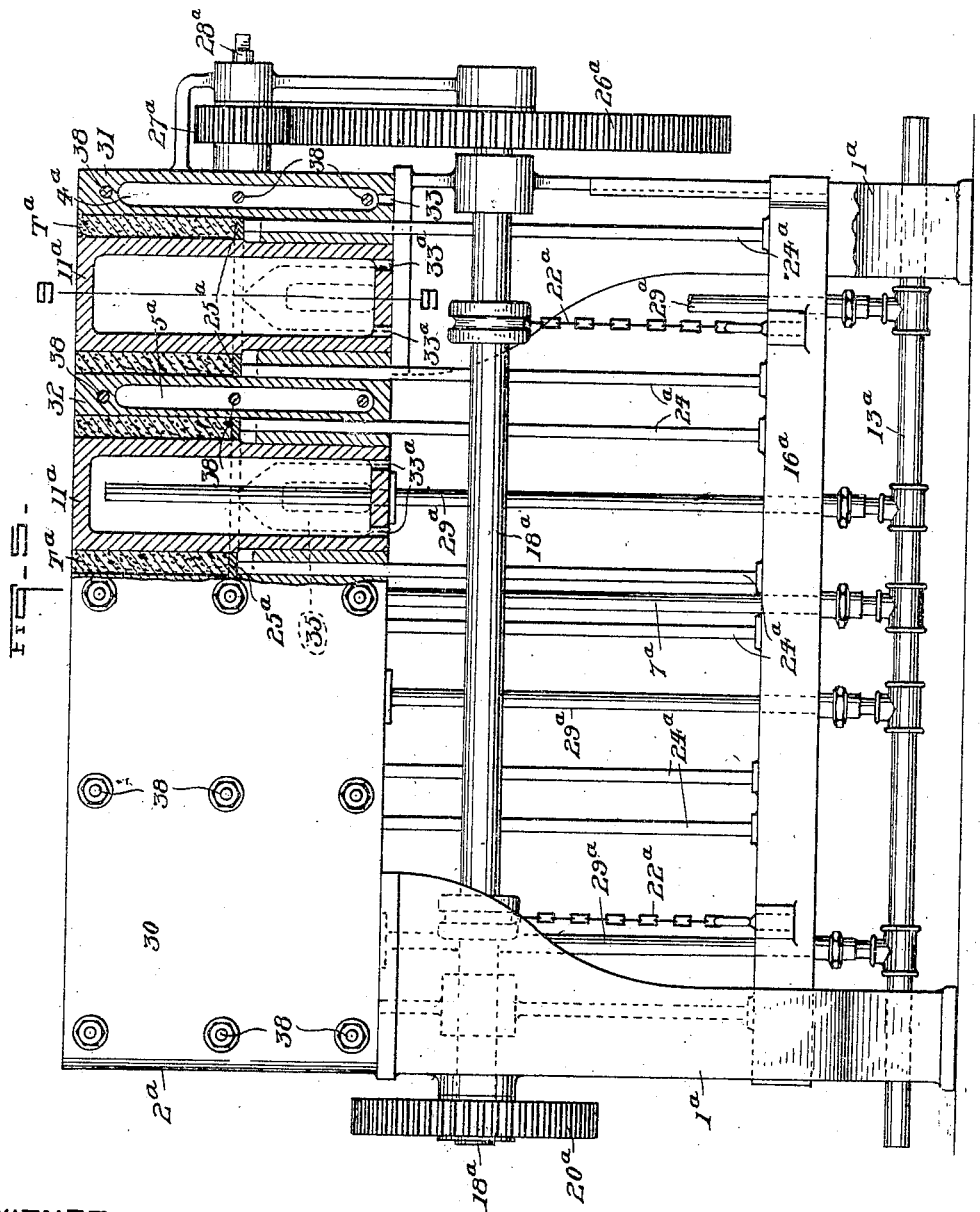

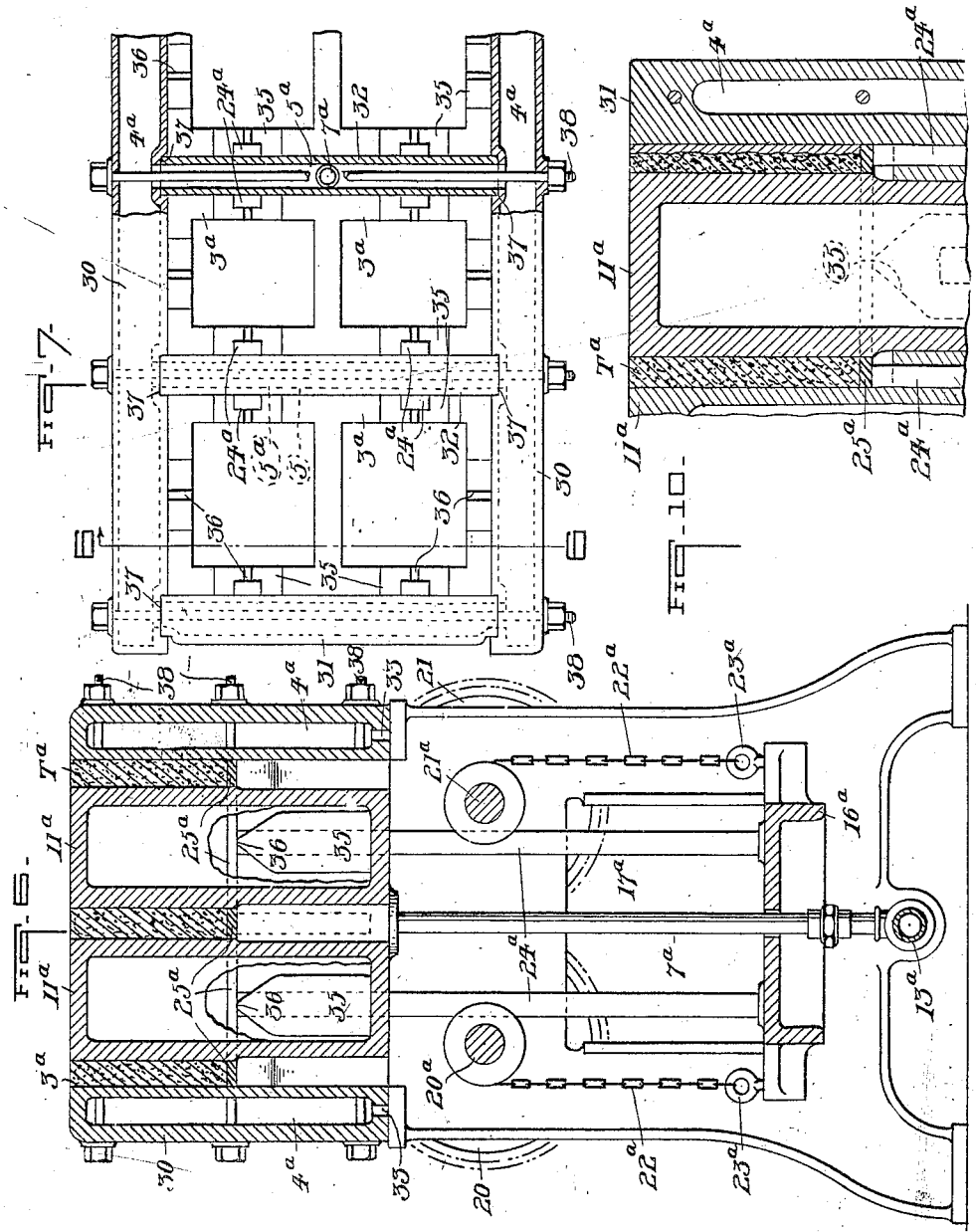

UNITED STATES PATENT OFFICE.

ALBERT A. PAULY, OF YOUNGSTOWN, OHIO, ASSIGNOR TO THE CONCRETE STONE AND SAND COMPANY, OF YOUNGSTOWN, OHIO, A CORPORATION OF OHIO.

APPARATUS FOR FORMING ARTIFICIAL STONE.

965,002. Specification of Letters Patent. Patented July 19, 1910.

Application filed July 1, 1908. Serial No. 441,289.

*To all whom it may concern:*

Be it known that I, ALBERT A. PAULY, a citizen of the United States, residing at Youngstown, in the county of Mahoning and State of Ohio, have invented or discovered new and useful Improvements in Apparatus for Forming Artificial Stone, of which the following is a specification.

My invention relates to apparatus for molding sewer pipe, hollow tile, building blocks, and the like from Portland cement or its equivalent, in combination with ashes, sand, or other suitable material.

It is the principal object of the present invention to provide apparatus whereby artificial stone articles made from the above named materials may become quickly set or hardened in the molds so that they can be removed therefrom in a few minutes. When the said articles are made in the usual way without the aid of heat, they must be left in the molds for a day or two in order that they may become sufficiently hardened to permit their removal.

The principal feature of my invention resides in the peculiar construction of the molds whereby tile or hollow blocks may be heated both at their outer surfaces and at the surfaces in contact with the cores.

My invention also resides in novel means for stripping the molded objects from their molds and in the peculiar manner by which I apply the heating medium or media to the molds.

Other objects will appear hereinafter.

Referring to the drawings, which accompany this specification, Figure 1 is partly a side elevation and partly a vertical section showing my invention adapted for the manufacture of sewer pipe; Fig. 2, an elevation of the right-hand end of Fig. 1; Fig. 3, a vertical cross-section through the center of one of the molds of Fig. 1, showing a sewer pipe stripped from the mold; Fig. 4, a plan of Fig. 1; Fig. 5, partly a side elevation and partly a vertical longitudinal section showing my invention adapted for the manufacture of hollow tile with partitions; Fig. 6, a vertical section on the line 6—6 of Fig. 7; Fig. 7, a plan view of the left-hand portion of Fig. 5; Fig. 8, a fragmentary view showing in perspective a portion of the ejecting mechanism adapted to the form of molds shown in Figs. 1 to 4; Fig. 9, a section on the line 9—9 of Fig. 5, showing the manner of connecting the cores to the mold-bodies; Fig. 10, a vertical section showing a face plate in the mold to give one face of the molded article a rock surface or other desired finish.

Referring to Figs. 1, 2, 3, 4, and 8, I provide the two end standards or supports 1, on which the molds are supported. I have shown a single mold body 2 provided with four vertical dies or mold cavities 3 arranged in a line. The ends of the body 2 are supported on the standards 1. The outer wall of the mold body 2 is made hollow so as to form a passage for a heating fluid, as steam or water or both. The spaces between the dies 3 are made hollow also. The passage 4 in the outer wall of the body 2 preferably extends entirely around the same and the hollows or passages 5 between the dies 3 are connected at their ends to the passage 4 so as to form a water or steam jacketed structure surrounding the dies 3. 6 is a pipe supported on the lower ends of the standards 1 and 7, 7 are branch pipes connected to the pipe 6 and leading up through the ends of the mold body 2 into the passage 4. The branch overflow pipes 7 extend to a point near or just below the expanded portion 8 of the die 3, in which the bell of a sewer pipe is formed. The pipe 6 has connected thereto branch pipes 9, one for each die 3. The upper ends of the pipes 9 have threaded thereon the plugs 10, which are screwed into the bottom of a hollow cylindrical core 11 standing in the die 3. The pipes 9 support the cores 11, but it is clear that other means may be provided to support them. The upper ends of the cores have thereon the rings 12 seated in the expanded or bell-portion 8 of the dies 3. The space occupied by a ring 12 receives the plain end of an adjoining sewer pipe when two sewer pipes are joined for use. It is seen that the cement is thicker for a short distance below each ring owing to the upwardly flaring or off-set construction of the die at this place. Within the pipe 6 is the steam pipe 13, to which is connected the branch pipes 14 (only one shown) extending up within the pipes 7, the pipes 14 extending a short distance above the upper ends of the pipes 7 in order that steam may be admitted to the passage 4, above the upper surface of the water 15 which cannot rise above the ends of the overflow pipes 7. It will be seen that the sewer pipe below the bell is heated by the water while the bell itself is heated by the steam, which is hotter than the water, thus causing the thicker bell portion below the ring to harden or set as soon as the thinner portions of the pipe. When the water of condensation from the steam rises above the pipes 7, it will flow down the same and thence through the pipe 6. 16 is a crosshead guided for vertical movement in the slots 17 in the standards 1. The upper portion of the standards support a pair of shafts 18 and 19 parallel with the cross-head 16, the two shafts being connected by the gear wheels 20 and 21. These shafts have connected to them the chains 22 which have their lower ends connected to the eyes 23 carried by the cross-head 16. The crosshead supports beneath each die a number of ejector-bars 24 which extend up into the space between the dies 3 and the cores 11. The upper ends of the ejector-bars 24 support the rings or pallets 25 which form the bottoms of the molds. The shaft 19 has its end opposite the gear wheel 21 provided with the spur gear 26 with which the driving pinion 27 gears. The pinion 27 is supported by the shaft 28, to which a handle or other driving device may be attached. When the molded articles have become sufficiently hardened or set, the parts being as shown in Fig. 1, power is applied to the shaft 28 which obviously winds the chains 22 on the shafts 18, causing the ascent of the cross-head 16 and the ejector bars 24. Fig. 3 shows the position of all the parts when the molded pipe has been fully ejected. The interior of the cores is heated by the branch pipes 29 which are connected to the pipe 13 and extend up through the pipes 9 nearly to the top of the cores. I do not restrict myself to any particular location for the ends of the pipes 29, but I prefer to place them opposite the bell portions of the dies where the molded material is thickest, in order to hasten the setting of the material there. The water condensed from the steam runs down through the pipes 9 into the waste pipe 6.

Referring now to Figs. 5, 6, 7, and 9, I have designated all the parts thereof corresponding to Figs. 1, 2, 3, 4, and 8 by the same reference numerals with exponent letters. As shown most clearly in Fig. 7, I preferably make the mold body $2^a$ in sections. The sides 30 of the mold body are hollow and sufficiently long and wide to make the desired number of tile having the required length. The ends of the mold body are composed of hollow pieces 31, the hollows of the sides and ends communicating to form the continuous passage $4^a$. Hollow partitions 32 lie between the sides 30 and form the faces of adjacent dies $3^a$. The hollows $5^a$ in the partitions communicate at their ends with the passage $4^a$. Steam is admitted into the steam jackets consisting of the passages $4^a$ and $5^a$ by means of the branch steam pipe $7^a$ connected to the steam supply pipe $13^a$. The water condensation in the passages $4^a$ and $5^a$ escapes through the holes 33 or in any other desired way. Steam is supplied to the interior of the cores $11^a$ through the branch pipes $29^a$ connected to the steam supply pipe $13^a$ and water in the cores escapes through the holes $33^a$. The lower ends of the cores $11^a$ are provided with mortises or depressions 34 to receive the projections 35 on the inner walls of the mold body $2^a$ below the pallets $25^a$, the projections having their upper ends tapered and terminating in the narrow surfaces 36 on which the pallets rest. In case any cement escapes past the pallets, it will flow down the inclines on the projections 35 and not lodge on top of the projections as would be the case if the tops thereof were horizontal. The mold sides 30 are provided on their inner faces with the depressions or mortises 37 which receive the ends of the partitions 32 and the end pieces 31 in order to prevent their movement longitudinally of the sides. The sides 30 are held against the ends 31 and the partitions 32 by the bolts 38 which extend transversely through the sides and longitudinally through the ends and partitions.

It will be seen that the apparatus for making the cylindrical articles T in Figs. 1, 2, 3, and 4 is similar to that for making the rectangular articles $T^a$ in Figs. 5, 6, 7, and 9.

It will be understood that steam or water or both may be used in the mold body or the cores. The water may be heated before its introduction to the passages or while within the same by the action of the steam in the same and in the cores.

Many modifications of my invention may be made differing in the details and their combinations, but applicant believes his invention includes more than the precise structure shown and described and he desires his claims to be construed accordingly.

I claim—

1. The combination in a cement molding apparatus of a plurality of outer die members, a core member for each outer member, pallets between the said outer and core members, upwardly tapering supports for the pallets, a cross-head, and means carried by the cross-head for stripping the articles simultaneously from the molding apparatus.

2. The combination in a cement molding apparatus of a plurality of outer die members, a core member for each outer member, pallets between the said outer and core members, one of the said members having lugs seated in depressions in the other member to prevent the relative movement of said members and forming supports for the pallets, a cross-head, and means extending through said supports and carried by the cross-head for stripping the articles simultaneously from the molding apparatus.

3. The combination in a cement molding apparatus of a plurality of outer die members, a core member for each outer member, pallets between the said outer and core members, one of the said members having lugs seated in depressions in the other member to prevent the relative movement of said members, said lugs serving also to support the said pallets, a cross-head, and means carried by the cross-head for stripping the articles simultaneously from the molding apparatus.

4. In a molding die for cementitious material, continuous hollow side die-members, hollow die-members connecting the side die-members, the hollows in the two sets of members being in communication, depressions in one set of members to receive the ends of the other set of members, and means for securing the two sets of members together.

Signed at Youngstown, Ohio, this 25th day of June, A. D. 1908.

ALBERT A. PAULY.

Witnesses:
W. T. GIBSON,
BEULAH M. NIXON.